US012724898B2

(12) United States Patent
Chien

(10) Patent No.: US 12,724,898 B2
(45) Date of Patent: Sep. 1, 2026

(54) SYSTEM AND METHOD FOR REDUCING COMPUTING SERVICE DOWNTIME DURING FIRMWARE INSPECTION AND UPDATE PROCESSES

(71) Applicant: Quanta Computer Inc., Taoyuan City (TW)

(72) Inventor: Wei-Yu Chien, Taoyuan City (TW)

(73) Assignee: Quanta Computer Inc., Taoyuan City (TW)

( * ) Notice: Subject to any disclaimer, the term of this patent is extended or adjusted under 35 U.S.C. 154(b) by 81 days.

(21) Appl. No.: 18/816,541

(22) Filed: Aug. 27, 2024

(65) Prior Publication Data

US 2025/0335593 A1 Oct. 30, 2025

Related U.S. Application Data

(60) Provisional application No. 63/638,746, filed on Apr. 25, 2024.

(51) Int. Cl.
*G06F 21/57* (2013.01)
*G06F 13/42* (2006.01)

(52) U.S. Cl.
CPC ........ *G06F 21/572* (2013.01); *G06F 13/4282* (2013.01)

(58) Field of Classification Search
CPC ........................... G06F 21/572; G06F 13/4282
See application file for complete search history.

(56) References Cited

U.S. PATENT DOCUMENTS

| | | | | |
|---|---|---|---|---|
| 11,226,862 | B1 * | 1/2022 | Lambert | G06F 1/30 |
| 11,531,760 | B1 * | 12/2022 | Righi | G06F 21/85 |
| 2015/0331694 | A1 * | 11/2015 | Balakrishnan | G06F 9/44 713/2 |
| 2018/0096154 | A1 * | 4/2018 | Shivanna | G06F 21/572 |

FOREIGN PATENT DOCUMENTS

| | | | |
|---|---|---|---|
| CN | 114692160 | A | 7/2022 |
| TW | 202136996 | A | 10/2021 |

OTHER PUBLICATIONS

TW Office Action for Application No. 113139727 mailed Jul. 31, 2025, w/ Summary, 6 pp.
TW Search Report for Application No. 113139727 mailed Jul. 31, 2025, w/ First Office Action, 1 p.

* cited by examiner

*Primary Examiner* — Terrell S Johnson
(74) *Attorney, Agent, or Firm* — Nixon Peabody LLP

(57) ABSTRACT

A computing system includes a central processing unit (CPU), a baseboard management controller (BMC) coupled to the CPU via a first communication protocol, and a boot non-volatile memory. The BMC includes a first communication protocol controller, a BMC memory, a root of trust, and an internal BMC bus. The internal BMC bus is configured to communicatively couple the BMC memory, the first communication protocol controller, and the root of trust. The boot non-volatile memory is coupled to the BMC via the first communication protocol controller. The boot non-volatile memory is configured to store basic input/output system (BIOS) firmware and/or BMC firmware.

22 Claims, 10 Drawing Sheets

SYSTEM AND METHOD FOR REDUCING COMPUTING SERVICE DOWNTIME DURING FIRMWARE INSPECTION AND UPDATE PROCESSES

CROSS-REFERENCE TO RELATED APPLICATIONS

This application claims the benefit of and priority to U.S. Provisional Application No. 63/638,746, filed on Apr. 25, 2024, titled "OPTIMIZE THE BOOT FIRMWARE INSPECTION AND UPDATE PROCESSES TO MINIMIZE SERVICE DOWNTIME," which is hereby incorporated by reference herein in its entirety.

FIELD OF THE INVENTION

The present invention relates generally to booting procedures in computing systems, and more specifically, to systems and methods for reducing boot delays in computing systems due to firmware inspection.

BACKGROUND OF THE INVENTION

Computing systems (e.g., servers, desktop computers, laptop computers, etc.) are used in different contexts for a wide range of functions. Some computing systems operate on batteries and may require low-power operation to conserve charge on the batteries. On the other hand, some computing systems may be plugged into a power outlet, and low-power operation is not as important as computing performance. Many computing systems balance performance and power consumption, even when plugged into a power outlet. No matter what type of computing system is used, the computing system is typically initialized when powered-up. The process of initializing the computing system is called booting. Each computing system can have a different booting sequence or procedure based on the specific hardware components present in the computing system. Typically, computing systems store boot firmware in non-volatile memory that is verified by a root of trust. The root of trust typically verifies the boot firmware prior to the computing system relying on the boot firmware. This specific procedure can degrade boot performance by increasing boot time. The present disclosure is directed at solving problems related to boot performance.

SUMMARY OF THE INVENTION

The term embodiment and like terms, e.g., implementation, configuration, aspect, example, and option, are intended to refer broadly to all of the subject matter of this disclosure and the claims below. Statements containing these terms should be understood not to limit the subject matter described herein or to limit the meaning or scope of the claims below. Embodiments of the present disclosure covered herein are defined by the claims below, not this summary. This summary is a high-level overview of various aspects of the disclosure and introduces some of the concepts that are further described in the Detailed Description section below. This summary is not intended to identify key or essential features of the claimed subject matter. This summary is also not intended to be used in isolation to determine the scope of the claimed subject matter. The subject matter should be understood by reference to appropriate portions of the entire specification of this disclosure, any or all drawings, and each claim.

According to certain aspects of the present disclosure, a computing system is provided. The computing system includes a central processing unit (CPU), a baseboard management controller (BMC) coupled to the CPU via a first communication protocol, and a boot non-volatile memory. The BMC includes a first communication protocol controller, a BMC memory, a root of trust, and an internal BMC bus. The internal BMC bus is configured to communicatively couple the BMC memory, the first communication protocol controller, and the root of trust. The boot non-volatile memory is coupled to the BMC via the first communication protocol controller. The boot non-volatile memory is configured to store basic input/output system (BIOS) firmware and/or BMC firmware.

In an implementation, the first communication protocol is a serial peripheral interface (SPI). In an implementation, the boot non-volatile memory is a flash chip. In an implementation, the BMC further includes a second communication protocol controller. The second communication protocol controller supports out-of-band management. The second communication protocol controller can be an Ethernet controller. In an implementation, the BMC is configured to run a serial peripheral interface (SPI) simulator runtime service for communicating with the CPU via an SPI interface, a root of trust service for setting a status associated with the BMC memory, and an SPI BIOS reader service for communicating with the boot non-volatile memory. In an implementation, the BMC is further configured to run a Redfish service for out-of-band communication. In an implementation, the root of trust service is configured to activate or inactivate memory locations in the BMC memory. In an implementation, the root of trust service is configured to seal or unseal memory locations in the BMC memory. In an implementation, the boot non-volatile memory is programmed by the SPI BIOS reader service when the memory locations in the BMC memory are sealed and activated.

In an implementation, the root of trust is configured to verify content of the BMC memory via the internal BMC bus prior to storing the content of the BMC memory in the boot non-volatile memory as the BIOS firmware and/or the BMC firmware. In an implementation, the root of trust is configured to verify the content of the BMC memory once for multiple DC power cycles. In an implementation, the BMC is configured to retrieve the BIOS firmware from the boot non-volatile memory and store the BIOS firmware in the BMC memory, and the CPU is configured to retrieve the stored BIOS firmware in the BMC memory to perform a boot operation. In an implementation, capacity of the BMC memory is at least one gigabyte, and capacity of the boot non-volatile memory less than 128 megabytes. In an implementation, the BMC memory is powered via DC standby power such that content of the BMC memory is preserved through multiple DC power cycles.

In an implementation, the root of trust is configured to schedule a process of BIOS binary image back up to the boot non-volatile memory. In an implementation, the root of trust is configured to execute recovery actions from the boot non-volatile memory when BIOS binary image in the BMC memory fails verification. In an implementation, the BMC further includes a first communication protocol bus simulator running in slave mode. The first communication protocol bus simulator is configured to respond to boot non-volatile memory read and write demands from the CPU. In an implementation, the actions pertaining to the boot non-volatile memory read and write demands from the CPU are performed on the BMC memory instead of the boot non-volatile memory.

According to certain aspects of the present disclosure, a computing system is provided. The computing system includes a central processing unit (CPU), a baseboard management controller (BMC) coupled to the CPU via a first communication protocol, a first boot non-volatile memory, and a second boot non-volatile memory. The BMC includes a first communication protocol controller, a BMC memory, a root of trust, and an internal BMC bus. The internal BMC bus is configured to communicatively couple the BMC memory, the first communication protocol controller, and the root of trust. The first boot non-volatile memory is coupled to the BMC via the first communication protocol controller. The first boot non-volatile memory is configured to store BIOS firmware. The second boot non-volatile memory is coupled to the first communication protocol controller via the first communication protocol controller. The second boot non-volatile memory is configured to store BMC firmware.

The above summary is not intended to represent each embodiment or every aspect of the present disclosure. Rather, the foregoing summary merely provides an example of some of the novel aspects and features set forth herein. The above features and advantages, and other features and advantages of the present disclosure, will be readily apparent from the following detailed description of representative embodiments and modes for carrying out the present invention, when taken in connection with the accompanying drawings and the appended claims. Additional aspects of the disclosure will be apparent to those of ordinary skill in the art in view of the detailed description of various embodiments, which is made with reference to the drawings, a brief description of which is provided below.

BRIEF DESCRIPTION OF THE DRAWINGS

The disclosure, and its advantages and drawings, will be better understood from the following description of representative embodiments together with reference to the accompanying drawings. These drawings depict only representative embodiments, and are therefore not to be considered as limitations on the scope of the various embodiments or claims.

Figure 7:
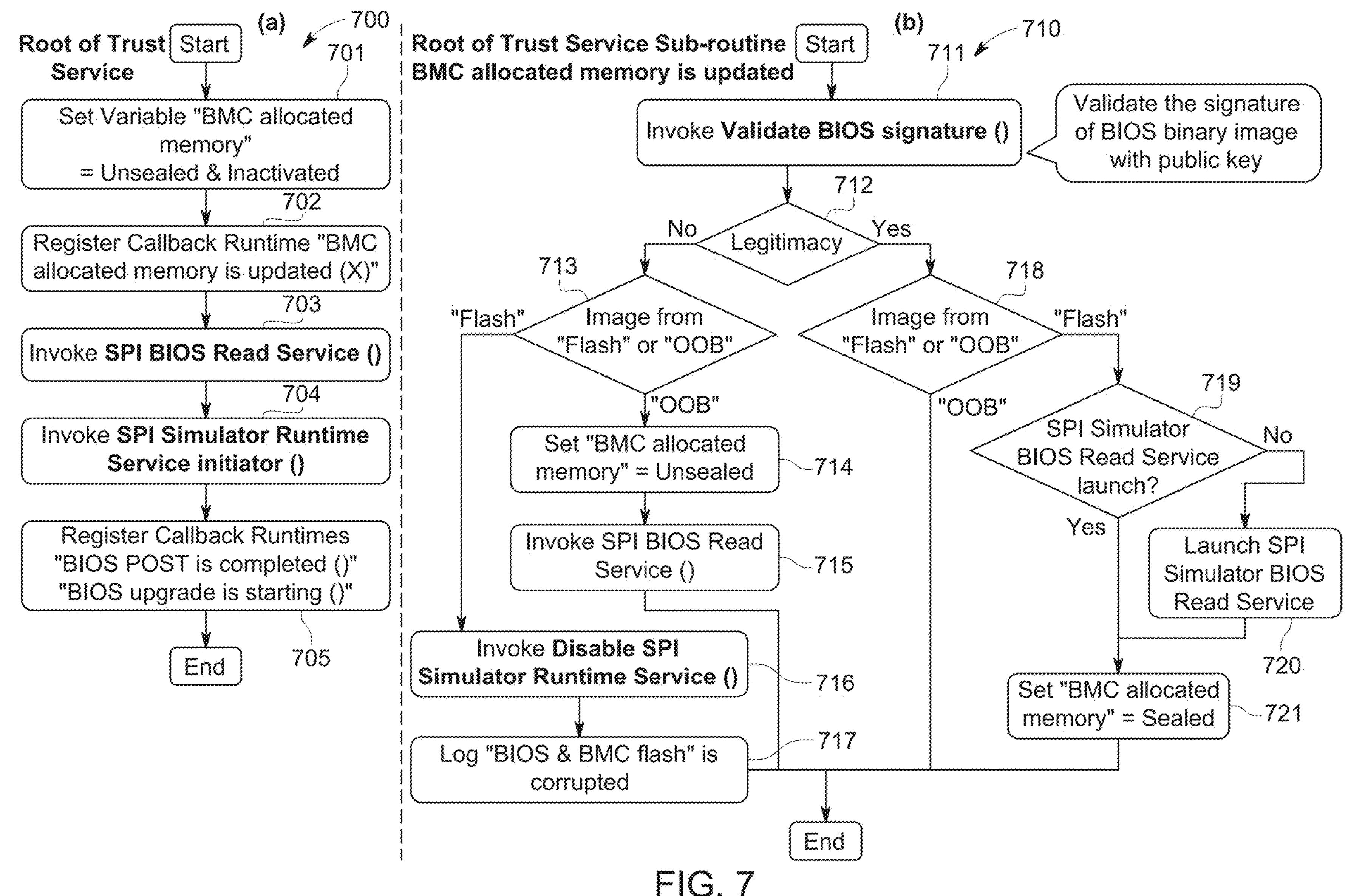

Inset (a) of FIG. 7 is a flow diagram for a root of trust service, according to certain aspects of the present disclosure.

Inset (b) of FIG. 7 is a flow diagram for a first root of trust service sub-routine, according to certain aspects of the present disclosure.

Figure 8:
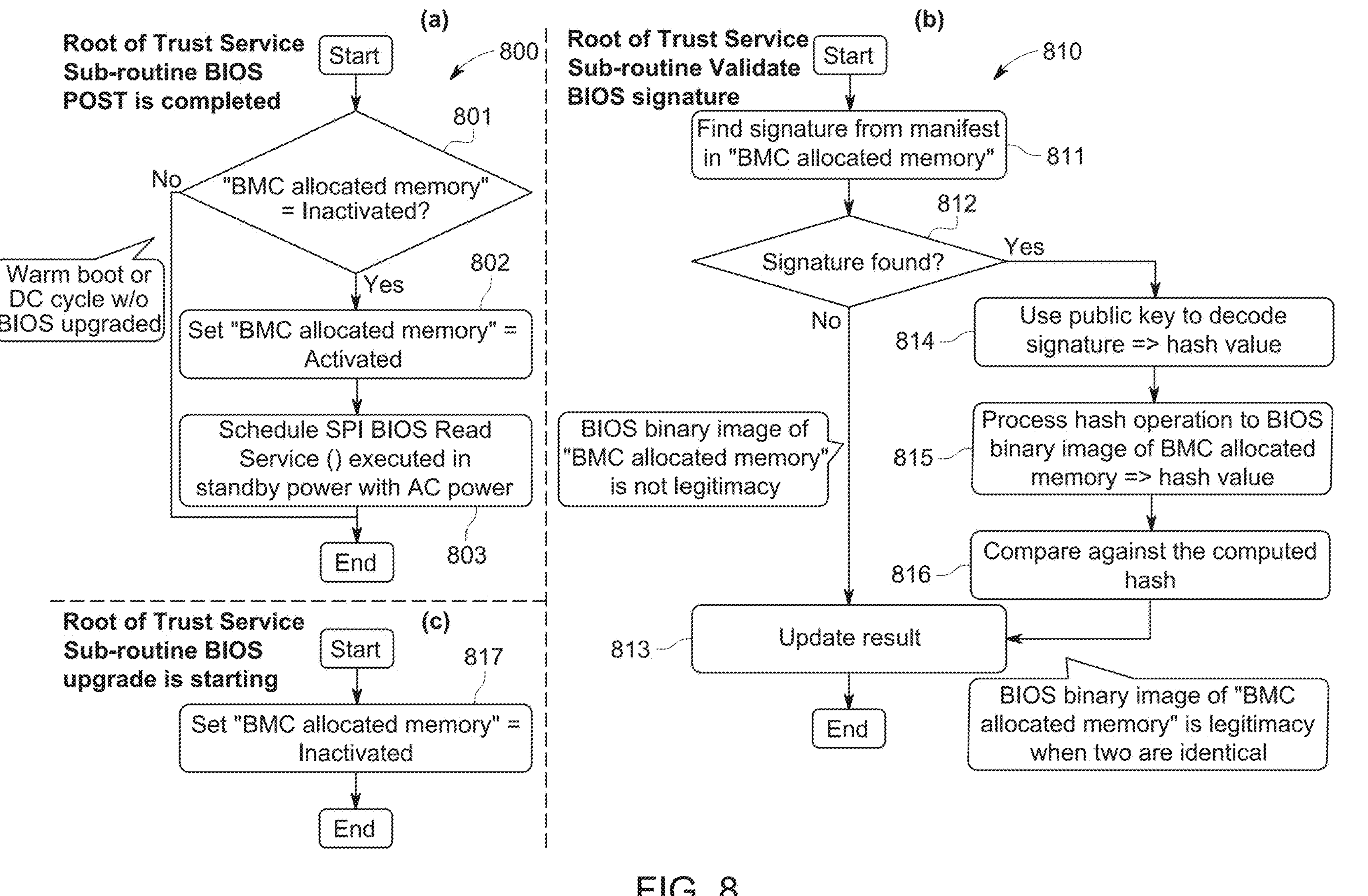

Inset (a) of FIG. 8 is a flow diagram for a second root of trust service sub-routine, according to certain aspects of the present disclosure.

Inset (b) of FIG. 8 is a flow diagram for a third root of trust service sub-routine, according to certain aspects of the present disclosure.

Inset (c) of FIG. 8 is a flow diagram for a fourth root of service sub-routine, according to certain aspects of the present disclosure.

Figure 9:
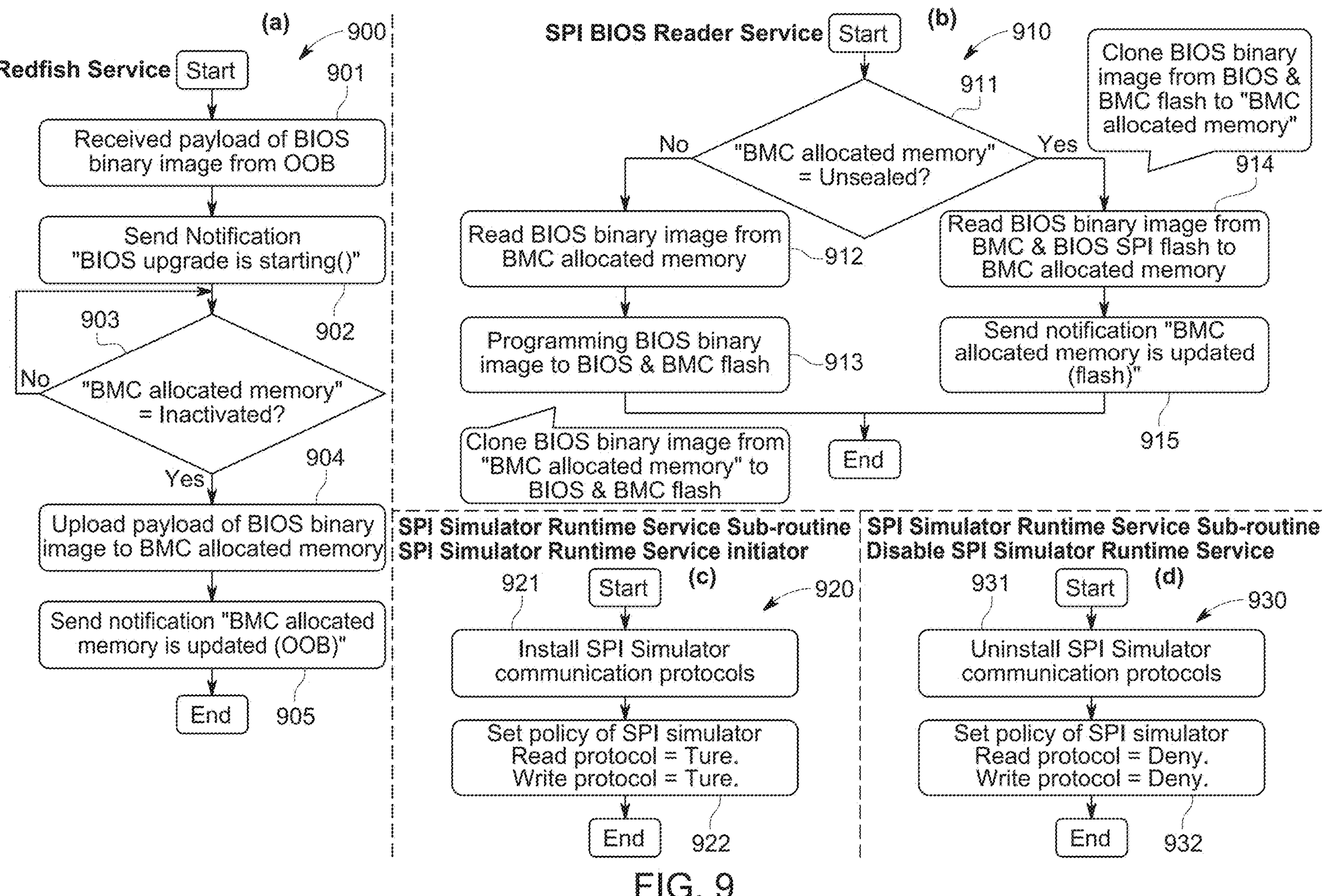

Inset (a) of FIG. 9 is a flow diagram for a Redfish service routine, according to certain aspects of the present disclosure.

Inset (b) of FIG. 9 is a flow diagram for an SPI BIOS reader service routine, according to certain aspects of the present disclosure.

Inset (c) of FIG. 9 is a flow diagram for a first SPI simulator runtime service sub-routine, according to certain aspects of the present disclosure.

Inset (d) of FIG. 9 is a flow diagram for a second SPI simulator runtime service sub-routine, according to certain aspects of the present disclosure.

DETAILED DESCRIPTION

Servers provide numerous real-time computing business services, utilizing a number of central processing unit (CPU) cores, memory modules, and input/output (I/O) peripherals as the foundational platform. Firmware that initializes the hardware and I/O peripherals supporting the operation of this platform typically requires updates to adapt to new technological demands. Firmware updates typically have to consider security, integrity, and required recovery mechanisms. Oftentimes, servers are accompanied by a tightly integrated design between management console, hardware and firmware to carry out a series of integrity firmware component checks, updates, and recovery processes. Due to the complexity of these procedures and prolonged downtime, reducing the usage efficiency of server business services also increases costs. Direct revenue loss resulting from a server outage can be about $5 million for every hour of downtime for a cloud provider. Thus, improving portions associated with server downtime can improve functionality and uptime of servers.

In a computing system, a processor (e.g., a central processing unit (CPU)) is typically involved in booting the basic input/output system (BIOS).

Providing two non-volatile memory modules on the same computing system just for initializing the computing system can be wasteful. The second non-volatile memory module provided can occupy space on a motherboard that could have been used for another component. Physical space on a motherboard is limited, and scaling trends in computer engineering have had a goal of fitting as much hardware on the motherboard as possible in order to boost functionality of computing systems. Furthermore, the scaling trends sometimes involve reducing the size of the motherboard so that computing systems can have a smaller form factor. Reducing hardware components, for example, reducing the number of non-volatile memory modules provided on the motherboard, can reduce financial costs associated with building computing systems. Thus, the present disclosure provides systems and methods for using a single non-volatile memory module to boot both the BIOS and BMC.

A booting sequence that accommodates sharing the single non-volatile memory module is provided.

Various embodiments are described with reference to the attached figures, where like reference numerals are used throughout the figures to designate similar or equivalent elements. The figures are not necessarily drawn to scale and are provided merely to illustrate aspects and features of the present disclosure. Numerous specific details, relationships, and methods are set forth to provide a full understanding of certain aspects and features of the present disclosure, although one having ordinary skill in the relevant art will recognize that these aspects and features can be practiced without one or more of the specific details, with other relationships, or with other methods. In some instances, well-known structures or operations are not shown in detail for illustrative purposes. The various embodiments disclosed herein are not necessarily limited by the illustrated ordering of acts or events, as some acts may occur in different orders and/or concurrently with other acts or events. Furthermore, not all illustrated acts or events are necessarily required to implement certain aspects and features of the present disclosure.

For purposes of the present detailed description, unless specifically disclaimed, and where appropriate, the singular includes the plural and vice versa. The word “including” means “including without limitation.” Moreover, words of approximation, such as “about,” “almost,” “substantially,” “approximately,” and the like, can be used herein to mean “at,” “near,” “nearly at,” “within 3-5% of,” “within acceptable manufacturing tolerances of,” or any logical combination thereof. Similarly, terms “vertical” or “horizontal” are intended to additionally include “within 3-5% of” a vertical or horizontal orientation, respectively. Additionally, words of direction, such as “top,” “bottom,” “left,” “right,” “above,” and “below” are intended to relate to the equivalent direction as depicted in a reference illustration; as understood contextually from the object(s) or element(s) being referenced, such as from a commonly used position for the object(s) or element(s); or as otherwise described herein.

Referring to FIG. 1, a block diagram of a computing system 100 is provided. Examples of the computing system 100 include a server, a laptop, a desktop computer, a smartphone, etc. The computing system 100 includes a circuit board 102. The circuit board 102 can be a printed circuit board (PCB) that serves as a communications backbone for all components and external peripherals that connect to the computing system 100. In some examples, the circuit board 102 is a motherboard that includes copper connecting traces and copper planes for power and signal isolation. The motherboard can include a processor 104, random access memory (RAM) modules 106, a BMC 108, BIOS 110, a root of trust 112, and/or one or more input/output (I/O) ports 114.

Although indicated as singular in FIG. 1, the processor 104 can be one or more processors (e.g., one processor, two processors, three processors, etc.). The processor 104 can include central processing units (CPUs) and graphical processing units (GPUs). In some implementations, GPUs are separated from CPUs and communicate with CPUs via the one or more I/O ports 114 on the circuit board 102. For example, the I/O ports 114 include peripheral component interconnect express (PCIe) slots for receiving GPUs, and the CPUs can manage initialization and operation of the GPUs via the PCIe bus standard. The GPUs are coupled to video interfaces that allow monitors or screens to connect to the circuit board 102. The processor 104 can be communicatively coupled to a platform controller hub or a chipset of the circuit board 102. The chipset of the circuit board 102 can provide access to communication standards such as serial advanced technology attachment (SATA) devices, peripheral component interconnect express (PCIe) devices, network interface cards (NICs), redundant array of inexpensive disks (RAID) cards, small computer system interface (SCSI) interface, field programmable gate array (FPGA) cards, etc.

The RAM modules 106 can include dual inline memory modules (DIMMs) of double data rate synchronous dynamic random access memory (DDR SDRAM). The RAM modules 106 are high speed volatile memory modules that serve as main memory for the processor 104. The main memory for the processor 104 is used when cache memory or register memory of the processor 104 does not include information that the processor 104 needs. The RAM modules 106 are higher capacity memory when compared to the cache memory or register memory of the processor 104. The RAM modules 106 can represent multiple RAM modules (e.g., multiple DIMMs, for example, two DIMMs, four DIMMs, eight DIMMs, etc.).

The BMC 108 is a specialized controller (or processor) for managing operations of the computing system 100. In some implementations, the BMC 108 enables remote monitoring of the computing system 100, having communication channels to different components of the computing system 100. For example, the BMC 108 can allow remote monitoring of fan speeds, temperature sensors, hard drive faults, power supply failures, operating system faults, etc. The BMC 108 can include internal temporary cache memory that facilitates the BMC 108 processing of machine readable instructions. Example BMCs include ASPEED AST2300, AST2400, AST2500, AST2600, etc.

The BIOS 110 represents a read only memory (ROM) or flash chip that is provided on the circuit board 102 that allows access and basic set up of the computing system 100. On startup of the computing system 100, the BIOS 110 includes instructions (or code) on how to load basic computer hardware (e.g., some of the components discussed above like the GPU, keyboard interface, mouse interface, etc.). The BIOS 110 includes a self-test that runs when the computing system 100 is powered-on to ensure that the computing system 100 meets requirements for booting up properly. The self-test is referred to as the BIOS power-on self-test (POST). A series of beeps are typically provided when the computing system 100 fails the BIOS POST. The pattern of beeps can be indicative of which hardware component failed. The BIOS POST picks up any basic problems. For example, the BIOS POST can provide (a) a basic memory check (e.g., check that items can be written to and read from memory), (b) a basic storage check (e.g., check that hard drives start up and accept commands and/or spin up and allow access), (c) a basic check of input and output devices (e.g., check that there are no stuck keys on the keyboard or that at least one of a keyboard or mouse is connected), etc.

The code in the BIOS 110 can be updated for various reasons. In an example, the firmware updates of the BIOS 110 can include driver updates for better control of peripheral devices like mice and keyboards. The firmware updates of the BIOS can include adding additional functionality such as upgrading a text-based BIOS to a graphical user interface (GUI) based BIOS. Typically, when firmware updates are made to the BIOS 110, BIOS settings can be overwritten.

The root of trust 112 is a complex programmable logic device (CPLD) that performs critical security functions. The root of trust 112 can include keys used for cryptographic functions and can enable a secure boot process. The root of trust 112 can be used to verify BMC and/or BIOS images. The root of trust 112 can be used to verify updated BIOS images, updated BMC images, etc. The root of trust 112 can verify these images prior to use by the processor 104.

The one or more I/O ports 114 can include SATA ports to connect bus adapters to storage devices such as hard disk drives, solid state drives, optical drives, etc. The I/O ports 114 can include more PCI or PCIe ports for receiving cards such as Ethernet cards, Wi-Fi cards, Bluetooth cards, sound cards, etc. The I/O ports 114 can include universal serial bus (USB) ports to connect peripheral devices or mass storage devices.

Figure 1A:
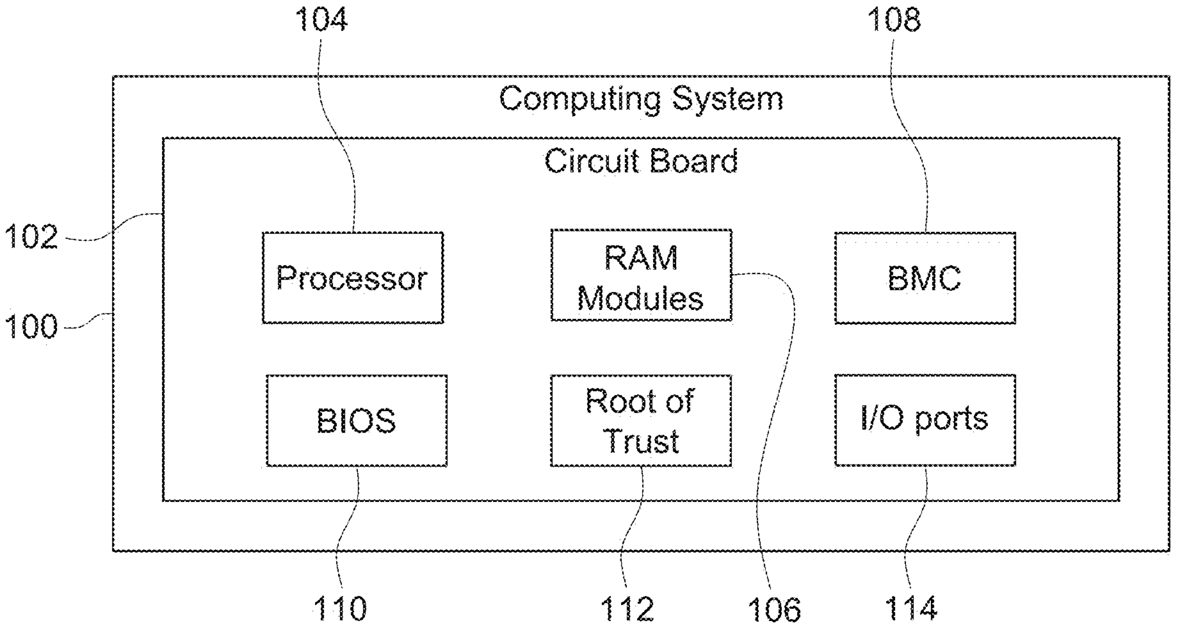
FIG. 1A is a block diagram of a computing system, according to certain aspects of the present disclosure.

Although a single circuit board 102 is provided in FIG. 1A, the computing system 100 can include multiple nodes having multiple circuit boards. In some implementations, each circuit board is a server board representing a different server node. In some implementations, a single BMC (e.g., the BMC 108) can manage operations of the multiple circuit boards. In some implementations, multiple BMCs can manage operations of the multiple circuit boards such that a corresponding circuit board has a corresponding BMC.

Figure 1B:
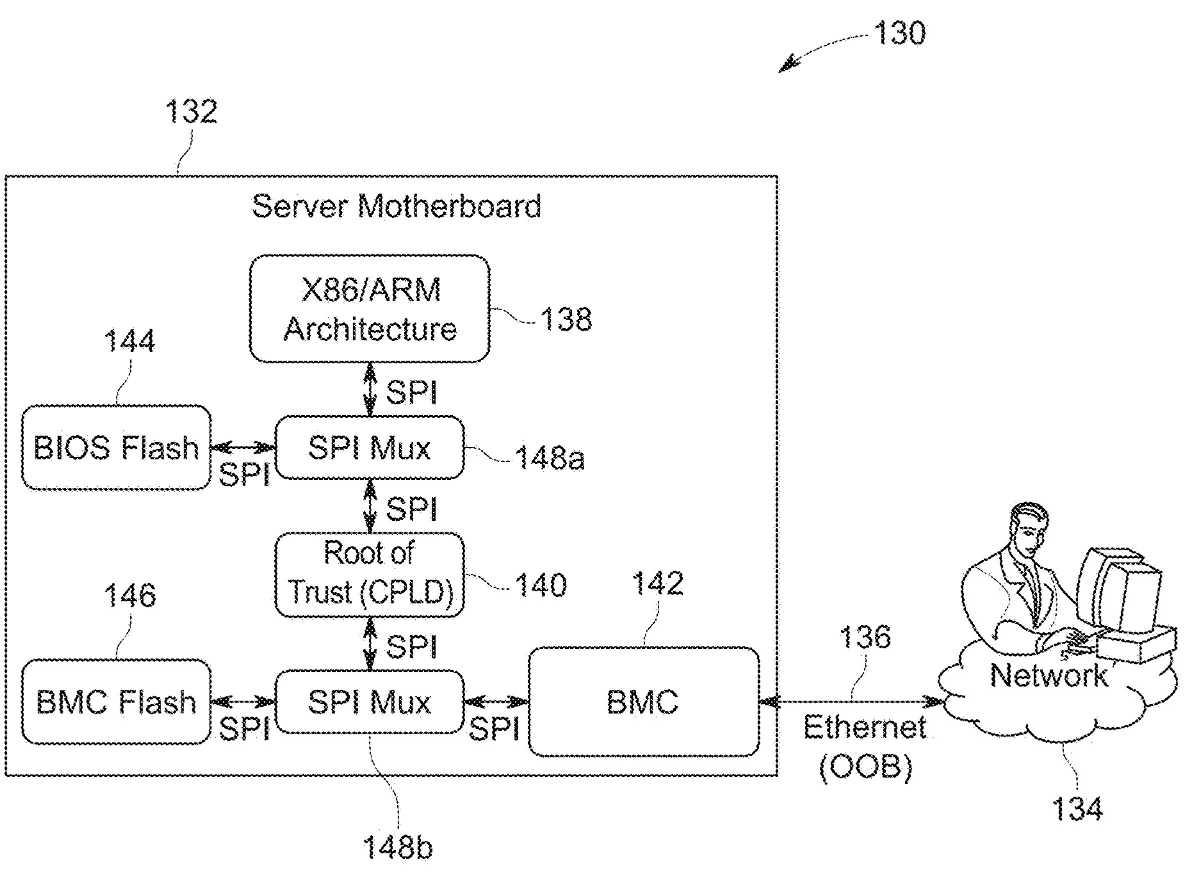
FIG. 1B is a block diagram illustrating connections of BIOS and BMC flash chips on a circuit board in the prior art.

Referring to FIG. 1B, a block diagram, illustrating a system 130 for out-of-band management and connections of BIOS flash 144 and BMC flash 146 on a server motherboard 132 in the prior art is provided. The system 130 includes the server motherboard 132 and an external network 134. The server motherboard 132 gains access to the external network 134 via an Ethernet communication protocol 136. The Ethernet communication protocol 136 can support out-of-band communication.

The server motherboard 132 is a circuit board provided in a computing system (e.g., the computing system 100). The server motherboard 132 includes a computer processor architecture 138, a root of trust 140, a BMC 142, the BIOS flash 144, the BMC flash 146, and SPI muxes 148*a*, 148*b*. The computer processor architecture 138 can be an x86 architecture or an ARM architecture.

The boot firmware of a server, i.e., the BIOS or Unified Extensible Firmware Interface (UEFI), is stored in a non-volatile memory. In FIG. 1B, the non-volatile memory is the BIOS flash 144. The BIOS flash 144 is interfaced by any industry standard interface that connects between a core processor (included in the computer processor architecture 138) and an erasable programmable read-only memory device. During server platform power-on, the root of trust 140, a designated processor unit, checks the integrity and legitimacy of partition of the BIOS flash 144. Afterward, the boot firmware (i.e., BIOS or UEFI) is loaded from the non-volatile memory (i.e., the BIOS flash 144) into system memory (included in the computer processor architecture 138). The core processor then executes an initialization process until an operating system of the server is loaded.

Boot firmware updates can be performed either in-band or out-of-band. When boot firmware is updated, the root of trust 140 writes new firmware content into the correct partition of the non-volatile memory. The root of trust 140 can validate new BIOS image and/or BMC image destined for the BIOS flash 144 or BMC flash 146, respectively. The term "downtime" refers to the unavailability of the server system, device, or application's core services, both internal and/or external, after the server receives boot firmware update instructions. Boot firmware update instructions are typically followed by a series of boot firmware content download, a check to verify the downloaded boot firmware content, and an update that applies the downloaded boot firmware content or a recovery process that reverts to an older boot firmware version if verification of the downloaded boot firmware content fails.

The computer processor architecture 138 reads from the BIOS flash 144 via the SPI mux 148*a* using the SPI protocol. The BMC flash 146 receives BMC image via the SPI mux 148*b*. The root of trust 140 sets and controls the SPI muxes 148*a* and 148*b* to allow programming of the BIOS and/or BMC images. The root of trust 140 also sets and controls the SPI muxes 148*a* and 148*b* when the BIOS and/or BMC images are to be used by the computer processor architecture 138 and/or the BMC 142.

The root of trust 140 performs verification on the BIOS flash 144 and/or the BMC flash 146. The root of trust 140 connects with the BIOS flash 144 and/or the BMC flash 146 to examine content for "correctness." For example, the root of trust 140 can examine the content for a right signature, checksum, and whether the stored content is complete. The root of trust 140 performs this check before every boot process. Only after the check is complete does the root of trust 140 enable the next boot process and allow the core processor in the computer processor architecture 138 to read from the BIOS flash 144 for setting up and starting services provided by the server. During upgrading of BIOS image and/or BMC image, the root of trust 140 connects the SPI interface and programs the respective image into the respective flash.

The root of trust 140 always performs an examination every time the server starts up to ensure integrity of the BIOS and/or BMC image. If the BMC 142 does not upgrade the BIOS and/or BMC image well due to a power loss and the BIOS and/or BMC image becomes corrupted, then a recovery mechanism is triggered. In some cases, the recovery mechanism includes reading a recovery image back into the BIOS and/or BMC image. The server motherboard 132 provides complex hardware connections and firmware design to ensure integrity of the BIOS and/or BMC images. Embodiments of the present disclosure provide systems and methods for reducing the complexity of hardware connections and firmware design associated with FIG. 1B.

In general, the SPI Bus serves as the communication interface between the core processor of the computer processor architecture 138 and the erasable programmable read-only memory device (e.g., the BIOS flash 144). The core processor internally constructs SPI master control logic and communicates with the BIOS flash 144 configured as an SPI slave. The communication is accomplished via signals of the SPI industrial standard interface (e.g., chip select (CS), synchronous clock (SCLK), master out slave in (MOSI), and master in slave out (MISO)) for reading and writing operations. Whether during server boot-up, where the root of trust 140 must perform content security check before the core processor reads BIOS content, or during BIOS updates, where prior backup of BIOS content needs to be completed, different hardware logic circuits in both the root of trust 140 and the BMC 142 cooperate to achieve this goal. Additionally, complexity in circuit design of the root of trust 140, the BIOS flash 144, and the BMC flash 146 is increased due to different SPI masters utilizing muxes for read/write operations on the non-volatile memories (i.e., the BIOS flash 144 and the BMC flash 146).

Figure 2:
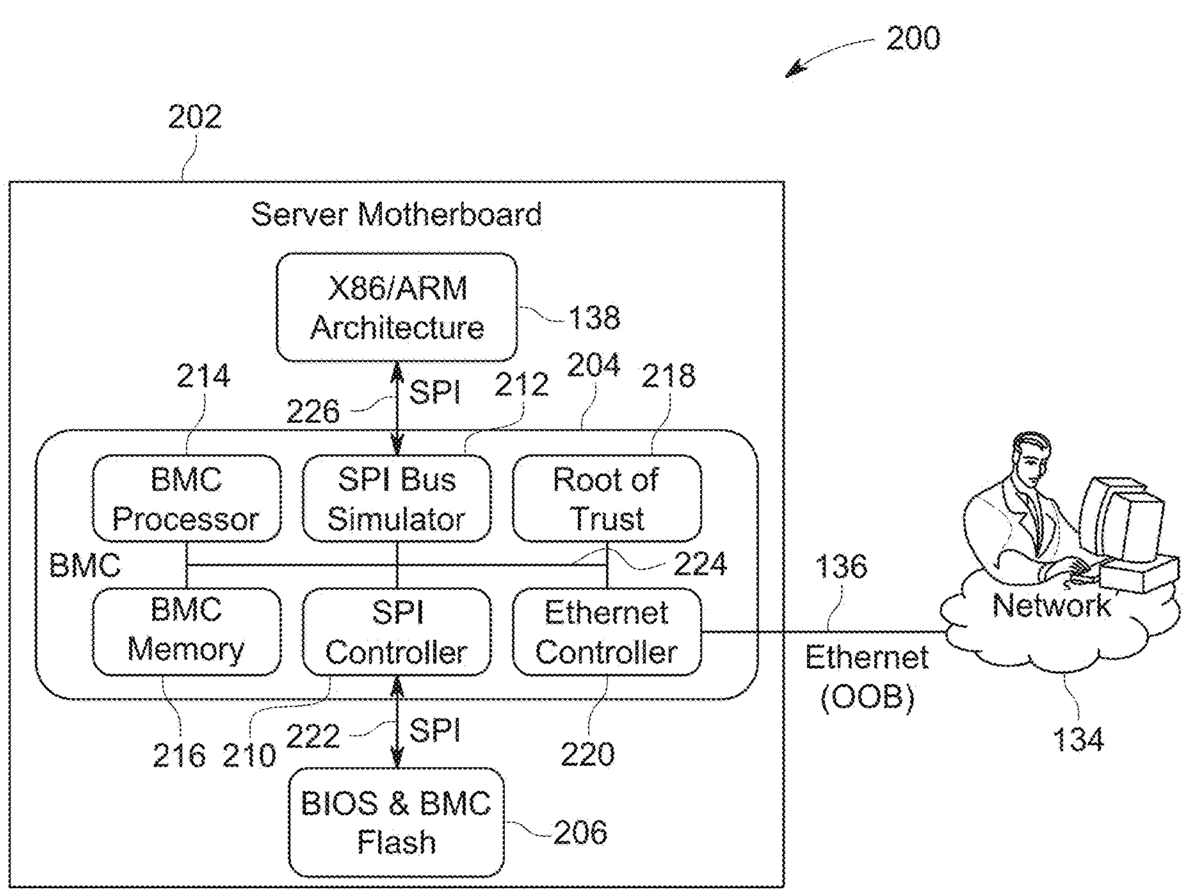
FIG. 2 is a block diagram illustrating connections of BIOS and BMC flash chips on a circuit board, according to certain aspects of the present disclosure.

Referring to FIG. 2, a block diagram illustrating a system 200 for out-of-band management and connections of a BIOS and BMC flash 206 on a circuit board is provided, according to certain aspects of the present disclosure. The circuit board is similar to or the same as the circuit board 102 (FIG. 1A). The circuit board is identified as server motherboard 202. The system 200 includes the server motherboard 202 and the external network 134. Similar to FIG. 1B, the server motherboard 202 gains access to the external network 134 via an Ethernet communication protocol 136. The Ethernet communication protocol 136 is merely provided as an example, but any communication protocol that supports out-of-band communication can be used. Although out-of-band communication is used here as an example, access to the external network 134 is also possible using in-band communication. Thus, any communication protocol that supports out-of-band communication and in-band communication can be used. The communication protocol need not be a wired communication protocol either. Wireless protocols such as Bluetooth, WiFi, etc., can be used to gain access to the external network 134.

The server motherboard 202 is a circuit board provided in a computing system (e.g., the computing system 100). The server motherboard 202 includes the computer processor architecture 138, a BMC 204, and the BIOS and BMC flash 206. In some implementations, the BIOS and BMC flash 206 is provided as a single flash chip. In some implementations, the BIOS and BMC flash 206 includes multiple flash chips having a first flash chip for storing a BIOS image and a second flash chip for storing a BMC image. The BIOS and BMC flash 206 is a boot non-volatile memory. A boot non-volatile memory is an erasable read-only memory or some other memory for storing BIOS image and/or BMC image.

The computer processor architecture 138 includes a core processor (e.g., a CPU included in the processor 104 (FIG. 1A)), a core memory (e.g., on-chip memory of the processor 104, memory associated with the RAM modules 106, etc.). The computer processor architecture 138 is configured to run an operating system of the server having the server motherboard 202. The computer processor architecture 138 typically retrieves BIOS firmware from a boot non-volatile memory to initialize hardware and services associated with the server prior to booting into the operating system. The computer processor architecture 138 can retrieve the BIOS firmware from the boot non-volatile memory using a first communication protocol. In FIG. 2, the first communication protocol is provided as an SPI 226 interface. The SPI 226 interface facilitates communication between the BMC 204 and the core processor of the computer processor architecture 138.

The BMC 204 can include an SPI bus simulator 212. The SPI bus simulator 212 can run in slave mode. The SPI bus simulator 212 is configured to respond to boot non-volatile memory read and write demands from the core processor of the computer processor architecture 138.

The BMC 204 includes an SPI controller 210. The SPI controller 210 is an example of a first communication protocol controller that facilitates communication between the BMC 204 and the BIOS and BMC flash 206. An SPI interface 222 is provided to indicate that the BMC 204 reads from and/or writes to the BIOS and BMC flash 206 via the SPI interface 222.

The BMC 204 includes a BMC processor 214, a BMC memory 216, a root of trust 218, and an Ethernet controller 220. The BMC processor 214 and the BMC memory 216 cooperate to provide services associated with the BMC 204. In some implementations, the BMC processor 214 is a 4-core processor. The root of trust 218 is configured to provide similar functionality as the root of trust 112. The Ethernet controller 220 is configured to communicate with the external network 134 via the Ethernet communication protocol 136. As discussed above, Ethernet is merely used as an example. The Ethernet controller 220 can be any network controller for providing in-band and/or out-of-band communication. The BMC processor 214, the BMC memory 216, the SPI bus simulator 212, the SPI controller 210, the root of trust 218, and the Ethernet controller 220 are communicatively coupled via an internal BMC bus 224.

The internal BMC bus 224 can be a high-speed bus using a communication protocol different from SPI. The internal BMC bus 224 facilitate communication between the components of the BMC 204 identified in FIG. 2. Portions of the BMC memory 216 can be allocated for storing BIOS firmware and/or BMC firmware. The portions of the BMC memory 216 allocated for storing the BIOS firmware and/or the BMC firmware can be managed by the root of trust 218 using the internal BMC bus 224. Capacity of the BMC memory 216 can be orders of magnitude greater than the capacity of the BIOS and BMC flash 206. In some implementations, the BMC memory 216 can have a capacity of at least one gigabyte, and the BIOS and BMC flash 206 can have a capacity less than 128 megabytes. In some implementations, the BMC memory 216 can be about 16 gigabytes, while the BIOS and BMC flash 206 is about 64 megabytes. In the server motherboard 202 because the root of trust 218 is provided within the BMC 204, BIOS firmware communication with the core processor of the computer processor architecture 138 goes through the BMC 204.

In the system 200, the computer processor architecture 138 does not need to know the location of the BIOS and BMC flash 206. Due to the much larger capacity of the BMC memory 216 compared to the BIOS and BMC flash 206, the BMC memory 216 can contain multiple versions of BIOS firmware. For example, the root of trust 218 can allocate memory locations within the BMC memory 216 for a first BIOS firmware, and when upgrading the first BIOS firmware to a second BIOS firmware, root of trust 218 can create space for the second BIOS firmware within the BMC memory 216. The root of trust 218 can examine the contents of the second BIOS firmware at any time and does not have to wait until the server reboots. Reducing the amount of reading and writing to the BIOS and BMC flash 206 helps with the life cycle of the flash memory.

In some implementations, the SPI bus simulator 212 responds to the core processor's read and write demands on the SPI industrial standard interface. The core processor intends to make these demands to a boot non-volatile memory (e.g., a BIOS flash chip), but the SPI industrial standard interface signals are intercepted by the BMC 204 and the BMC memory 216 is used for responding to the core processor's read and write demands on the SPI industrial standard interface. SPI signals include CS, SCLK, MOSI and MISO, and can be emulated through four general purpose Input/Output (GPIO) pins of the BMC 204. The BMC 204 can perform this emulation using an associated new runtime service (SPI simulator runtime service), and even improve performance of partial protocol request/response using a field programmable gate array (FPGA) within the BMC 204. The SPI controller 210 can read from the BIOS and BMC flash 206, rendering the BIOS and BMC flash 206 a slave device that anyone can read and/or can write to. The communication path and protocol for reading and writing to the BIOS and BMC flash 206 is simplified compared to the server motherboard 132 of FIG. 1B. Code inside BMC can be used to emulate the described behavior (e.g., FPGA logic).

Figure 3:
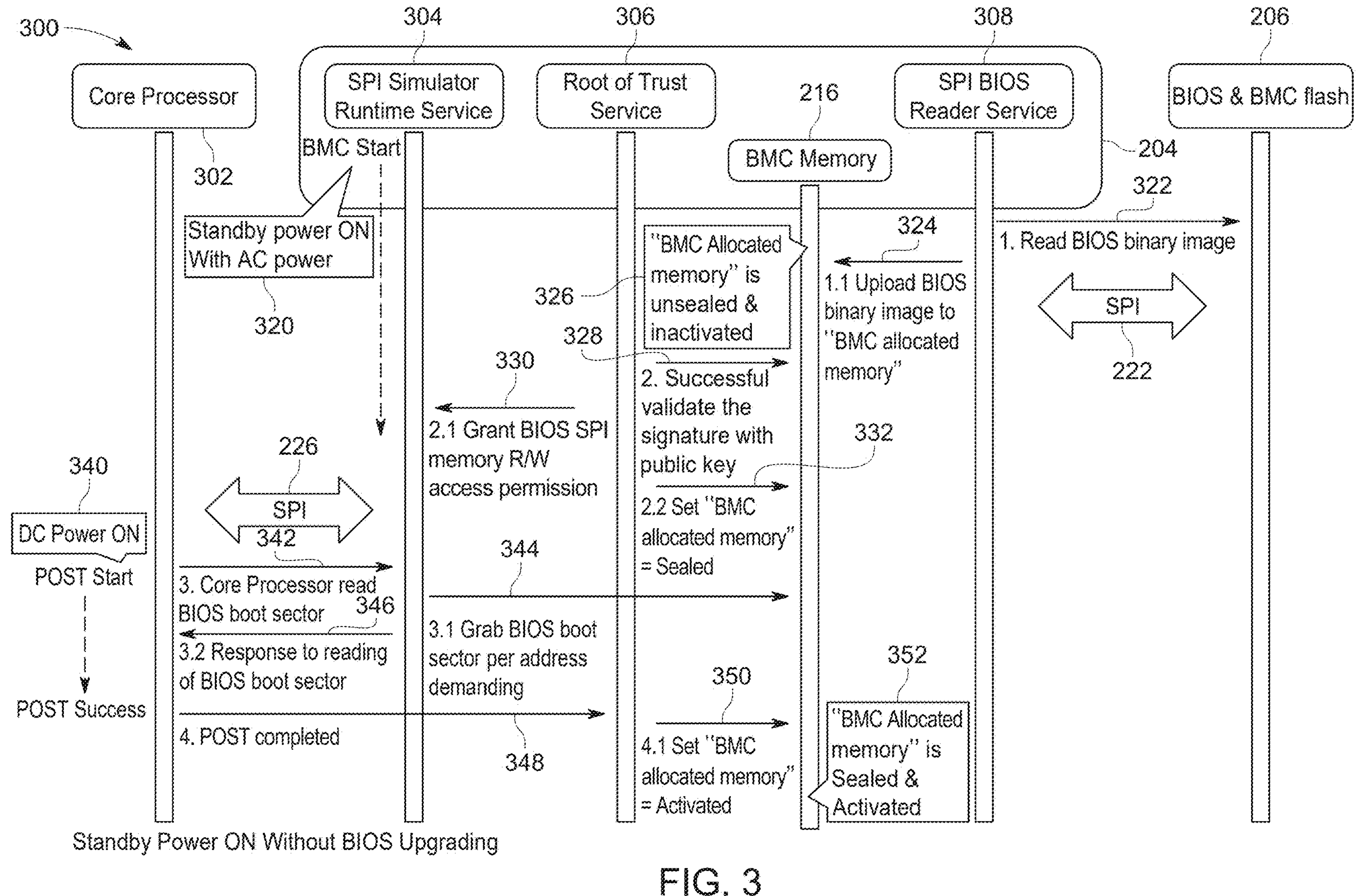
FIG. 3 is a flow diagram illustrating communication between a core processor, a BMC, and a BIOS and BMC flash chip when AC power is ON, according to certain aspects of the present disclosure.

FIG. 3 is a flow diagram illustrating communication 300 between a core processor 302, the BMC 204, and the BIOS and BMC flash 206 when AC power is ON, according to certain aspects of the present disclosure. The core processor 302 is a core processor associated with the computer processor architecture 138 (FIG. 2). The hardware and software components of the BMC 204 provided in FIG. 2 run various services including an SPI simulator runtime service 304, a root of trust service 306, and an SPI BIOS reader service 308. The SPI simulator runtime service 304 implements functions described above in connection with the SPI bus simulator 212 (FIG. 2). The root of trust service 306 implements functions described above in connection with the root of trust 218 (FIG. 2). The SPI BIOS reader service 308 implements functions described above in connection with the SPI controller 210 (FIG. 2).

In FIG. 3, with the AC power ON and DC power off, the BMC is running on DC standby power as indicated by item 320. In some implementations, plugging in the server into an AC outlet provides such DC standby power even though a power button on the server is not turned on. FIG. 3 also provides actions that can occur when the server is first plugged into the AC outlet. Item 320 indicates that the BMC 204 powers on and runs on standby power when AC power is available.

At first plug in, after the BMC 204 powers up (item 320), the BMC memory 216 is assumed to not contain valid BIOS binary image (i.e., valid BIOS firmware). Thus, the BMC memory 216 portion used for BIOS binary images is unsealed and inactivated, as provided in item 326.

At step 322, the SPI BIOS reader service 308 reads BIOS binary image from the BIOS and BMC flash 206 using the SPI interface 222. At step 324, the SPI BIOS reader service 308 uploads the BIOS binary image to the BMC memory 216. A portion of the BMC memory 216 is allocated by the root of trust 218 (FIG. 2) for storing and maintaining BIOS binary images. This portion of the BMC memory 216 will be henceforth referred to as BMC allocated memory. The SPI BIOS reader service 308 uploads the BIOS binary image, read from the BIOS and BMC flash 206, to the BMC allocated memory.

At step 328, the root of trust service 306 initiates a security process to check contents in the BMC allocated memory to ensure that the BIOS binary image is legitimate. After successfully validating the signature associated with the BIOS binary image with a public key, at step 330, the root of trust service 306 grants read/write access permission for the BIOS SPI memory to the SPI simulator runtime service 304. Here, the read/write access permission is being granted to master devices connected to the SPI simulator runtime service 304 for reading from and/or writing to the BMC allocated memory of the BMC memory 216. At step 332, status of the BMC allocated memory is indicated as sealed. A status of sealed is an indication that the BIOS binary image currently stored in the BMC allocated memory has been verified by the root of trust service 306.

Item 340 indicates a status of a DC power ON. For example, a power button on the server is turned on for the server to begin a booting process. The DC power ON event starts a POST procedure.

During the POST procedure, at step 342, the core processor 302 sends a request to read BIOS boot sector to the SPI simulator runtime service 304 using the SPI interface 226. The core processor 302 can request reading from specific portions of the BIOS boot sector based on addresses or an address range provided by the core processor 302. At step 344, the SPI simulator runtime service 304 reads requested portions of the BIOS binary image from the BMC allocated memory. At step 346, the SPI simulator runtime service 304 provides the read portions of the BIOS binary image to the core processor 302. Steps 342 through 346 result in the core processor 302 storing a copy of the BIOS binary image in a memory associated with the core processor. The SPI interface 226 is to receive the copy of the BIOS binary image. For ease and clarity in explanation, this copy of the BIOS binary image is termed core-copied BIOS image.

With the core-copied BIOS image in the memory associated with the core processor 302, the core processor 302 can use the core-copied BIOS image to further perform tasks associated with the POST procedure. At step 348, the core processor 302 alerts the root of trust service 306 that the POST procedure is completed.

At step 350, the root of trust service 306 sets a status of the BMC allocated memory as activated. An activated status indicates that the BIOS binary image used by the core processor 302 during the POST procedure is the same BIOS binary image stored in the BMC allocated memory. Item 352 indicates that the status of the BMC allocated memory of the BMC memory 216 is sealed and activated. In some implementations, the status is indicated as flags in memory locations where a single bit can indicate the status of the BMC allocated memory is sealed, and another single bit can indicate as activated. Both flags being asserted would indicate sealed and activated, and none of the flags being asserted would indicate unsealed and inactivated. One of the flags being asserted can indicate either sealed or activated. FIG. 3 shows that the root of trust service 306 can perform validation and legitimacy checks during DC standby power and does not have to be performed when the server is booting up for the first time. This can save some time during the booting process, especially when the validation and legitimacy checks by the root of trust service 306 are completed before the DC power is turned ON.

Figure 4:
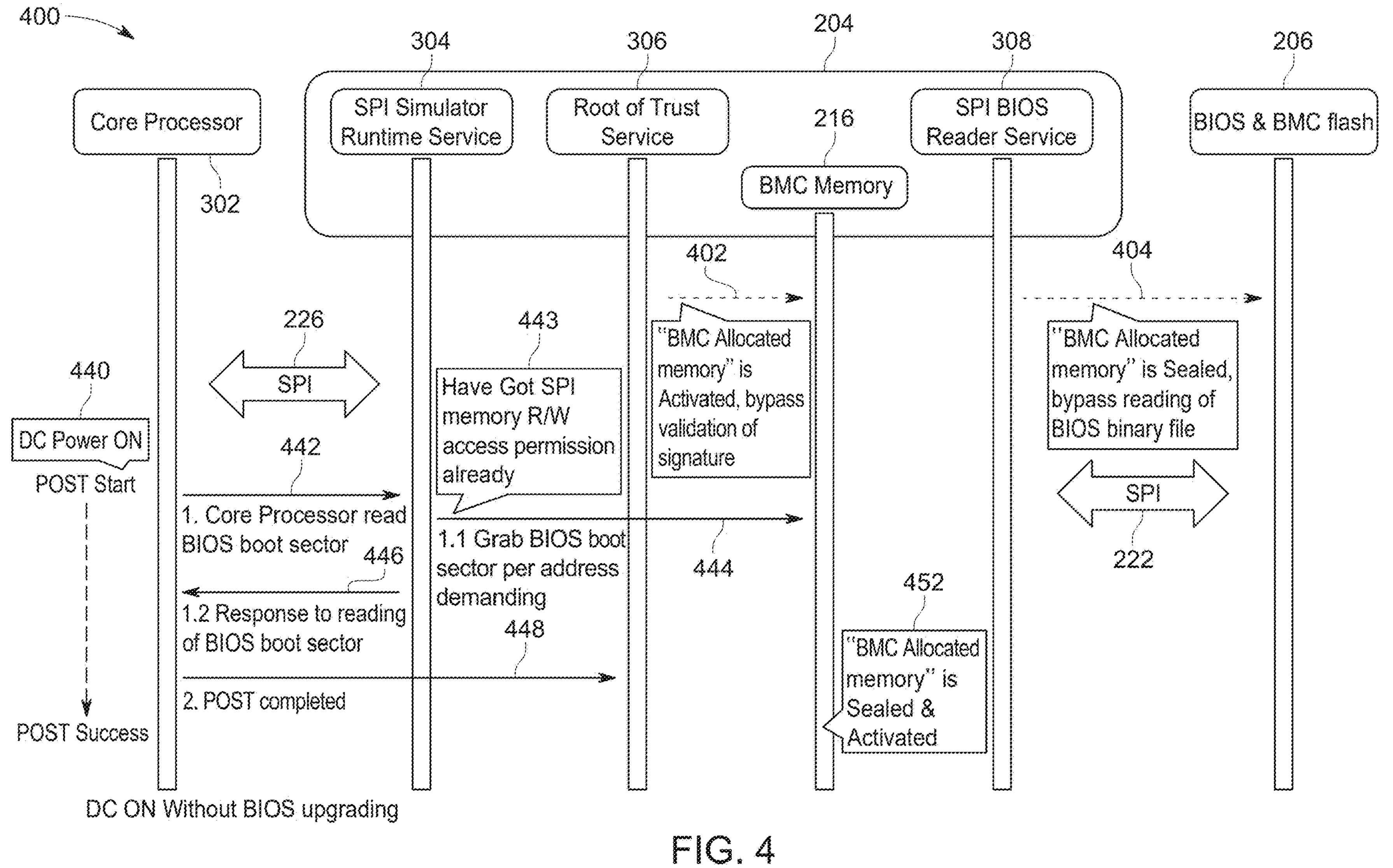
FIG. 4 is a flow diagram illustrating communication between the core processor, the BMC, and the BIOS and BMC flash chip when DC power is ON, according to certain aspects of the present disclosure.

FIG. 4 is a flow diagram illustrating communication 400 between the core processor 302, the BMC 204, and the BIOS and BMC flash 206 when DC power is ON, according to certain aspects of the present disclosure. An example scenario where the server is shut down and running on DC standby power is one where FIG. 4 would apply. In such a scenario, the communication 300 (FIG. 3) had already occurred such that the status of the BMC allocated memory is activated and sealed.

Item 402 indicates that when the BMC allocated memory is activated, then the root of trust service 306 can bypass checking legitimacy of the BMC binary image stored in the BMC memory 216. That is, no need to perform steps similar to steps 328 to 332 of FIG. 3. Furthermore, item 404 indicates that because the BMC allocated memory status is indicated as being sealed, the SPI BIOS reader service 308 can bypass reading of the BIOS binary image file stored in the BIOS and BMC flash 206. That is, no need to perform steps similar to steps 322 and 324 of FIG. 3.

Item 440 indicates a status of a DC power ON. For example, a power button on the server is turned on for the server to begin a booting process, similar to item 340. The DC power ON event starts a POST procedure. The POST procedure occurs as already described above in connection with FIG. 3. For example, step 442 is the same as or similar to step 342. Step 444 is the same or similar to step 344, step 446 is the same or similar to step 346, and step 448 is the same or similar to step 348. Item 452 is an indication that status of the BMC allocated memory remains as sealed and activated. FIG. 4 shows that the BIOS binary image does not have to be checked in a booting process every time the server is restarted, in contrast to the server architecture of FIG. 1B.

In some implementations, FIGS. 3 and 4 can be combined as follows. Once the BMC 204 powers up using AC power, there is an assumption that a golden BIOS binary image is well burned in the BIOS and BMC flash 206 during manufacturing. A new service name SPI BIOS reader service 308 can proceed to read the complete content of the BIOS binary image stored in the BIOS and BMC flash 206 into the BMC allocated memory. Subsequently, the new BMC's security mechanism (i.e., the root of trust service 306) conducts integrity and security checks on the content in BMC allocated memory to ensure legitimacy of the content. Once confirmed, the root of trust service 306 notifies the SPI simulator runtime service 304 to allow all reading and writing responses from the core processor 302 to the BMC memory 216.

After the core processor starts up in DC power, the core processor 302 extracts the BIOS binary image from the BMC allocated memory through the SPI simulator runtime service 304 and performs the POST procedure to completion. The BMC allocated memory is set to activated mode on POST completion. Following a legitimate security certification, each DC cycle BMC can retain the BIOS binary image in BMC allocated memory, eliminating the need for repetitive integrity and security checks, thus reducing time for performing the POST procedure compared to the server architecture of FIG. 1B.

Figure 5:
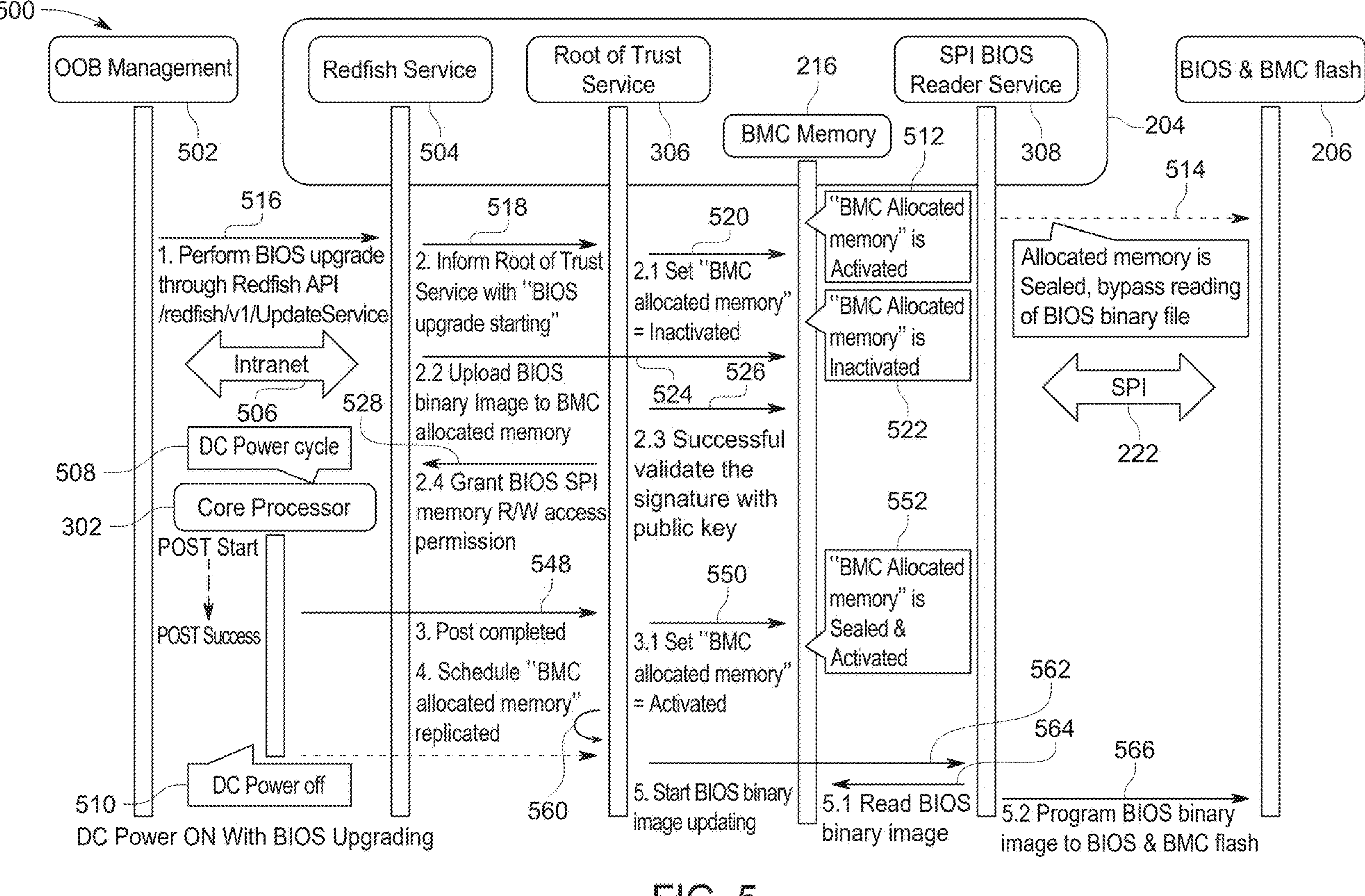
FIG. 5 is a flow diagram illustrating communication between the BMC and the BIOS and BMC flash chip when BIOS is upgraded, according to certain aspects of the present disclosure.

FIG. 5 is a flow diagram illustrating communication 500 between the BMC 204 and the BIOS and BMC flash 206 when BIOS binary image is upgraded, according to certain aspects of the present disclosure. An out-of-band (OOB) management 502 represents a remote computing device (e.g., a computing device or computing system used by an administrator). The OOB management 502 can communicate with the BMC 204 via Ethernet, as previously described. In FIG. 5, the Ethernet connection can be within an internal network (i.e., an Intranet 506). The BMC 204 can run one or more services that facilitate communication over the Intranet 506. For example, in FIG. 5, the BMC 204 runs a Redfish service 504.

OOB management occurs when DC power is OFF, and the BMC 204 is running on DC standby power. In the scenario in FIG. 5, item 512 indicates that the BMC allocated memory is activated. Item 514 indicates that the BMC allocated memory is sealed. Therefore, similar to item 404 (FIG. 4), reading of the BIOS binary file is bypassed.

At step 516, the OOB management 502 provides a command to the Redfish service 504 that the BMC 204 perform a BIOS upgrade. The command indicates that the Redfish API/redfish/v1/UpdateService be used for the BIOS upgrade. At step 518, the Redfish service 504 informs the root of trust service 306 that a BIOS upgrade is starting. At step 520, in response to the initiation of the BIOS upgrade, the root of service 306 sets the BMC allocated memory to inactivated. Item 522 indicates that the BMC allocated memory is inactivated.

At step 524, new BIOS binary image is uploaded to the BMC allocated memory via the Redfish service 504. Once the BMC allocated memory is replaced by new BIOS binary image, the BMC allocated memory is turned as unsealed. At step 526, the root of trust service 306 initiates a security process to check contents in the BMC allocated memory to ensure that the BIOS binary image is legitimate, similar to step 328 (FIG. 3). Once validated as legitimate, at step 528, the root of trust service 306 grants read/write access permission for the BIOS SPI memory, similar to step 330 (FIG. 3).

Item 508 indicates DC power cycle, where the DC power is turned ON. The core processor 302 performs the POST procedure as discussed above (e.g., in connection with FIG. 3). The core processor 302 alerts the root of trust service 306 of the completion of the POST procedure in step 548, similar to step 348 or step 448. With the POST procedure completed, the root of trust service 306 sets a status of the BMC allocated memory as activated in step 550, similar to step 350. Item 552 indicates that the BMC allocated memory is sealed and activated.

At step 560, the root of trust service 306 schedules a backup of the BMC allocated memory (i.e., that the BMC allocated memory be replicated). Item 510 indicates that DC power is turned off. Using standby DC power, at step 562, the root of trust service 306 informs the SPI BIOS reader service 308 to backup the new BIOS binary image to the BIOS and BMC flash 206. At step 564, the SPI BIOS reader service 308 reads the new BIOS binary image from the BMC memory 216. At step 566, the SPI BIOS reader service programs the new BIOS binary image to the BIOS and BMC flash 206.

Embodiments of the present disclosure utilize the BMC allocated memory as the medium to store the updated BIOS binary image (i.e., the new BIOS binary image). The root of trust service 306 inspects the new BIOS binary image and schedules a process of backing up the new BIOS binary image to the BIOS and BMC flash 206. In some implementations, if the root of trust service 306 is unable to validate the new BIOS binary image (i.e., the new BIOS binary image is illegal), the root of trust service 306 executes recovery actions from the BIOS and BMC flash 206. The example provided in FIG. 5 reduces downtime of cycling server power and upgrading BIOS firmware.

In some implementations, the SPI MUX 148*a*, 148*b* for switching SPI bus circuit and actions due to multiple SPI masters is eliminated. Furthermore, there is no requirement for regular security checks during each server DC power startup. Embodiments of the present disclosure provide for checking the updated BIOS binary image on the BMC allocated memory that has been programmed from in-band or out-of-band upgrading and using a public key to validate signature of BIOS binary image, after confirming legitimacy and correctness. The root of trust service 306 can schedule the backup of the updated BIOS binary image of BMC allocated memory to the BIOS and BMC flash 206 during a future DC off state. The scheduling of writing to the BIOS and BMC flash 206 can reduce repetitive writes to the BIOS and BMC flash 206, thereby increasing lifetime of the BIOS and BMC flash 206 through less frequent writing compared to the architecture of FIG. 1B. Similarly, due to legitimacy validation and writing of the BIOS and BMC flash 206 occurring in the DC off state, downtime of the server can be used more efficiently, and the bootup process can be faster compared to the architecture of FIG. 1B. Security of the BIOS binary image is enhanced when stored in the BMC memory 216 because any malicious attacks on the SPI interface 226 from the server core processor 302 can be blocked by the SPI bus simulator 212.

Figure 6:
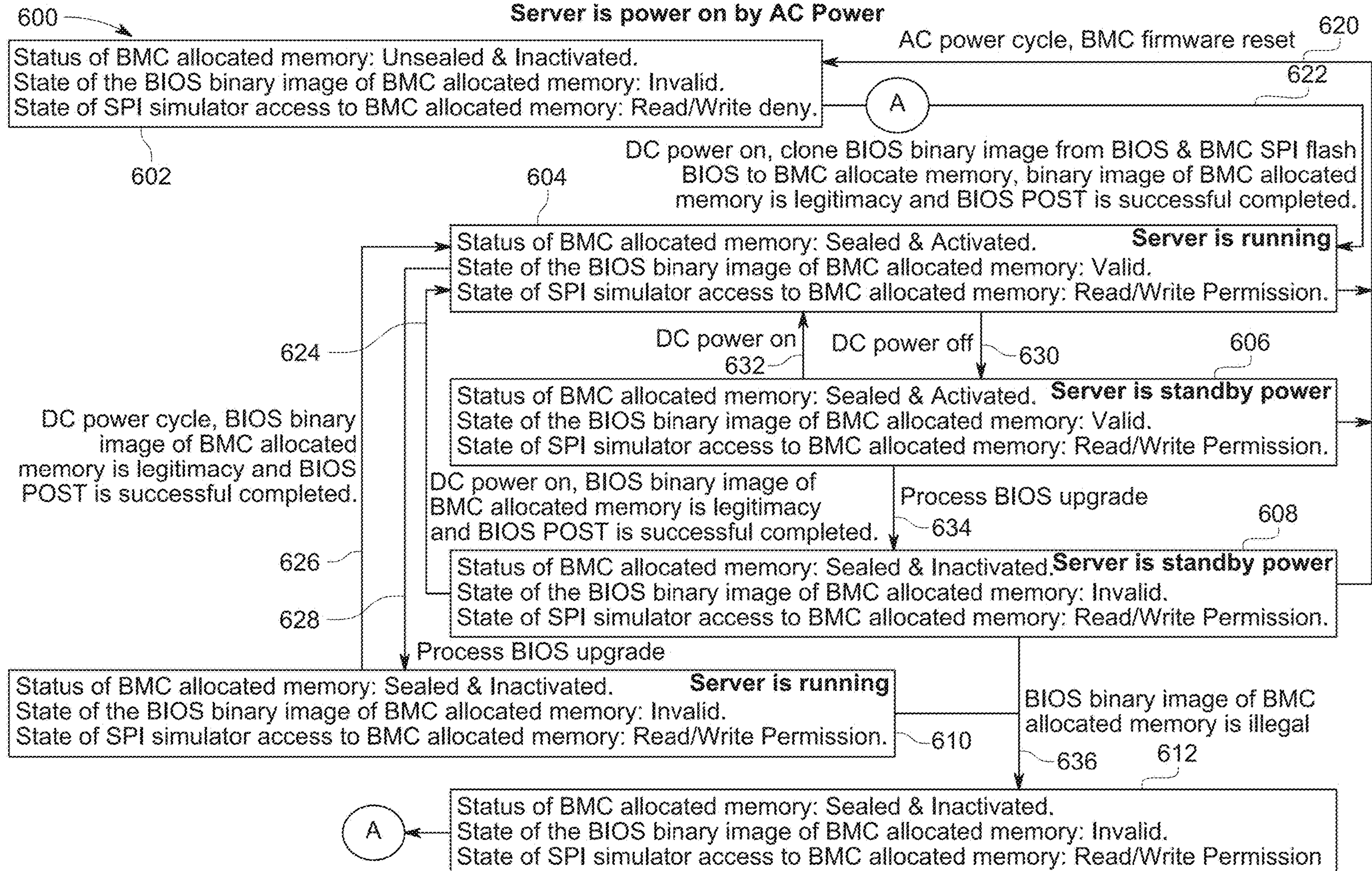
FIG. 6 is a flow diagram illustrating state change of a BMC allocated memory, according to certain aspects of the present disclosure.

FIG. 6 is a flow diagram 600 illustrating state change of a BMC allocated memory, according to certain aspects of the present disclosure.

At state 602, the server is powered-on by AC power (e.g., plugging into the AC outlet as discussed above). In state 602, the BMC allocated memory is unsealed and inactivated, the BIOS binary image of the BMC allocated memory is invalid, and the SPI simulator runtime service 304 does not have read/write access to the BMC allocated memory. See items 320 and 326.

From state 602, transition 622 occurs after DC power is ON; the BIOS binary image is cloned from the BIOS and BMC SPI flash 206 to the BMC allocated memory; the root of trust service 306 verifies that the cloned BIOS binary image is legitimate; and the core processor 302 successfully completes the POST procedure. The transition 622 results in state 604. In state 604, the server is running; the BMC allocated memory is sealed and activated; the BIOS binary image of the BMC allocated memory is valid; and the SPI simulator runtime service 304 has read/write access to the BMC allocated memory.

From state 604, if AC power turns OFF and turns back ON, then transition 620 is taken to return to state 602. If a BIOS upgrade process is initiated, then transition 628 is taken to reach state 610. In state 610, the server is running, the BMC allocated memory is changed to sealed and inactivated, the BIOS binary image of the BMC allocated memory is changed to invalid, and the SPI simulator runtime service 304 retains read/write access to the BMC allocated memory. From state 604, if DC power is turns OFF, then transition 630 is taken to reach state 606. In state 606, the server is running on DC standby power, the BMC allocated memory remains sealed and activated, the BIOS binary image of the BMC allocated memory is valid, and the SPI simulator runtime service 304 retains read/write access to the BMC allocated memory.

From state 606, if DC power is turned back on, then transition 632 is taken to return to state 604. If AC power turns OFF and turns back ON, then transition 620 is taken to return to state 602. If a BIOS upgrade process is initiated, then transition 634 is taken to reach state 608. In state 608, the server continues running on DC standby power, the BMC allocated memory is changed to sealed and inactivated, the BIOS binary image of the BMC allocated memory is set to invalid, and the SPI simulator runtime service 304 retains read/write access to the BMC allocated memory.

From state 608, if DC power is turned back on, BIOS binary image of the BMC allocated memory is legitimate, and the POST procedure is completed, then transition 624 is taken to return to state 604. If AC power turns OFF and turns back ON, then transition 620 is taken to return to state 602. If the updated BIOS binary image of the BMC allocated memory is illegitimate (or illegal), then transition 636 is taken to state 612. In state 612, the BMC allocated memory remains sealed and inactivated; the BIOS binary image of the BMC allocated memory remains invalid; and the SPI simulator runtime service 304 retains read/write access to the BMC allocated memory.

State 612 can also be reached from state 610 when the BIOS binary image of the BMC allocated memory is illegitimate. From state 610, if the DC power cycles (i.e., DC power OFF and ON), the updated BIOS binary image of the BMC allocated memory is legitimate, and the POST procedure is successfully completed, then transition 626 is taken to reach state 604.

From state 612, after DC power is ON, the BIOS binary image is cloned from the BIOS and BMC SPI flash 206 to the BMC allocated memory, the root of trust service 306 verifies that the cloned BIOS binary image is legitimate, and the core processor 302 successfully completes the POST procedure; the transition 622 is taken to reach state 604. The letter "A" indicates the connection of state 612 to 604. The transition from state 612 to state 604 occurs after a recovery process and a BIOS binary image is retrieved from the BIOS and BMC flash 206.

The core processor 302 and the BMC 204 on the server are two independent operating eco-systems. After the AC Power is turned on, the BMC 204 starts its own initialization and late provides the BIOS binary image required by the core processor 302 through the SPI simulator runtime service 304 to perform the POST procedure. The BIOS binary image can be upgraded through OOB interface in server running state or power off with standby power state. Embodiments of the present disclosure uses two states of the BMC allocated memory to operate both general POST process and the specific POST process with the BIOS binary image upgraded.

Additionally, from the perspective of the server core processor 302, the BMC SPI simulator runtime service 304 can effectively standardize software and hardware requirements for virtual SPI flash because SPI signals and protocols provided by the SPI bus simulator 212 (e.g., read/write/erase) are fixed with unique ID. Thus, the BMC 204 can easily connect to different core processor platforms, such as Intel or AMD, without the need to consider customization and compatibility on the server core processor side. FIGS. 7-9 provide example structure of routines and sub-routines that can be used across various core processor platforms, according to certain aspects of the present disclosure.

Inset (a) of FIG. 7 is a flow diagram 700 for a root of trust service, according to certain aspects of the present disclosure. The root of trust service sets a variable "BMC allocated memory" to unsealed and inactivated at step 701. The root of trust service registers a callback runtime "BMC allocated memory is updated (X)" at step 702. The root of trust service invokes "SPI BIOS Read Service ( )" at step 703. The root of trust service invokes "SPI Simulator Runtime Service initiator ( )" at step 704. The root of trust service registers callback runtimes "BIOS POST is completed ( )" and "BIOS upgrade is starting ( )" at step 705.

Inset (b) of FIG. 7 is a flow diagram 710 for a first root of trust service sub-routine related to step 702 "BMC allocated memory is updated (X)", according to certain aspects of the present disclosure. The first root of trust service sub-routine invokes "Validate BIOS signature ( )" at step 711. At step 712, based on the results of a legitimacy check, the first root of trust service sub-routine determines whether the BIOS binary image checked is from the BIOS and BMC flash 206 or OOB in steps 713 and 718. If the legitimacy check indicates an illegitimate BIOS signature and the BIOS binary image checked is OOB, then the BMC allocated memory is set to unsealed in 714, and "SPI BIOS read service ( )" is invoked in 715. If the legitimacy check indicates an illegitimate BIOS signature and the BIOS binary image checked is Flash, the first root of trust service sub-routine invokes "Disable SPI simulator runtime service ( )" at step 716. At step 717, a log indicating that the BIOS and BMC flash 206 is created.

If the legitimacy check indicates a legitimate BIOS signature and the BIOS binary image is Flash, then the first root of trust service sub-routine determines whether the SPI simulator BIOS read service is already launched at step 719. If not launched, then the SPI simulator BIOS read service is launched at step 720 before setting the BMC allocated memory to sealed at step 721.

Inset (a) of FIG. 8 is a flow diagram 800 for a second root of trust service sub-routine related to step 705 "BIOS POST is completed ( )", according to certain aspects of the present disclosure. At step 801, if the BMC allocated memory is inactivated, then the BMC allocated memory is set to activated at step 802. At step 803, the SPI BIOS read service ( ) is scheduled for execution in DC standby power with AC power.

Inset (b) of FIG. 8 is a flow diagram 810 for a third root of trust service sub-routine related to step 711 "Validate BIOS signature ( )", according to certain aspects of the present disclosure. At step 811, the third root of trust service sub-routine searches for signature from manifest in BMC allocated memory. At step 812, a determination is made on whether the signature is found, and if not found, then at step 813 the BIOS binary image of the BMC allocated memory is illegitimate and updated as such. At step 812, if the signature is found, then at step 814, a public key is used to decode the signature to obtain a first hash value. At step 815, a hash operation is performed on the BIOS binary image of the BMC allocated memory to obtain a second hash value. At step 816, the first and second hash values are compared against each other, and the BIOS binary image of the BMC allocated memory is legitimate when the two hash values are identical. At step 813, the result is updated on whether the BIOS binary image is legitimate.

Inset (c) of FIG. 8 is a flow diagram for a fourth root of service sub-routine related to step 705 "BIOS upgrade is starting ( )", according to certain aspects of the present disclosure. At step 817, the fourth root of service sub-routine sets the BMC allocated memory as inactivated.

Inset (a) of FIG. 9 is a flow diagram 900 for a Redfish service routine, according to certain aspects of the present disclosure. At step 901, the Redfish service receives payload of BIOS binary image from OOB. At step 902, the Redfish service sends notification "BIOS upgrade is starting ( )". At step 903, if BMC allocated memory is activated then the upgrade waits until the BMC allocated memory is inactivated. At step 903, if the BMC allocated memory is inactivated, then at step 904, the Redfish service uploads the payload of the BIOS binary image to the BMC allocated memory. At step 905, the Redfish service sends notification "BMC allocated memory is updated (OOB)".

Inset (b) of FIG. 9 is a flow diagram 910 for an SPI BIOS reader service routine, according to certain aspects of the present disclosure. At step 911, if the BMC allocated memory is unsealed, then at step 914, the BIOS binary image is read from the BMC and BIOS flash 206 to the BMC allocated memory. A notification indicating "BMC allocated memory is updated (flash)" is provided at step 915. At step 911, if the BMC allocated memory is sealed, then at step 912, the BIOS binary image from the BMC allocated memory is read. The read BIOS binary image is programmed in the BMC and BIOS flash 206 at step 913.

Inset (c) of FIG. 9 is a flow diagram 920 for a first SPI simulator runtime service sub-routine related to step 704 "SPI simulator runtime service initiator ( )", according to certain aspects of the present disclosure. At step 921, the first SPI simulator runtime service sub-routine installs SPI simulator communication protocols. At step 922, read and write protocols of the SPI simulator policy are both set to "True".

Inset (d) of FIG. 9 is a flow diagram 930 for a second SPI simulator runtime service sub-routine related to step 716 "Disable SPI simulator runtime service ( )", according to certain aspects of the present disclosure. At step 931, the second SPI simulator runtime service sub-routine uninstalls SPI simulator communication protocols. At step 932, the read and write protocols of the SPI simulator policy are both set to "Deny".

Embodiments of the present disclosure provide a combination design of BMC hardware and software for computing systems (e.g., servers). The BMC hardware and software incorporate a simulated logic circuit for the SPI bus into the BMC chipset, enabling the BMC to respond to read and write actions on the SPI Bus to one or more core processors. In some embodiments, BIOS and BMC firmware binary images are integrated into a single flash chip, then read BIOS firmware from the SPI controller into BMC memory. The BMC's internal root of trust performs checks and authentication of BIOS firmware. Once the signature is confirmed to be complete and legitimate, BIOS firmware is immediately retained in the BMC memory. There is no need to repeat the inspection process every time DC Power is turned on. BIOS firmware out-of-band updates are also checked and authenticated through the BMC memory, and once confirmed to be legitimate and complete, the BMC writes new BIOS firmware back into the non-volatile flash chip for backup. Embodiments of the present disclosure provide optimizations that enhance booting process of computing systems by reducing inspection and updating process of UEFI BIOS per server management point of view, thereby reducing downtime required for boot firmware updates.

Embodiments of the present disclosure provide, within the BMC, new software stack and hardware interface between the core processor and BIOS and BMC SPI flash memory. The new software stack and hardware interface allow for BIOS integrity checks, access, and updates. The new software stack and hardware interface include a hardware SPI bus simulator slave and an associated runtime service, a BIOS binary image being stored in BMC allocated memory, and a root of trust service provisioned for BIOS upgrading. The software stack allows BIOS binary image management. The BIOS binary image can be examined by the root of trust service at any time and does not need to occur only on reboot.

Although the disclosed embodiments have been illustrated and described with respect to one or more implementations, equivalent alterations and modifications will occur or be known to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application.

While various embodiments of the present disclosure have been described above, it should be understood that they have been presented by way of example only, and not limitation. Numerous changes to the disclosed embodiments can be made in accordance with the disclosure herein, without departing from the spirit or scope of the disclosure. Thus, the breadth and scope of the present disclosure should not be limited by any of the above described embodiments. Rather, the scope of the disclosure should be defined in accordance with the following claims and their equivalents.

What is claimed is:

1. A computing system comprising:

a central processing unit (CPU);

a baseboard management controller (BMC) coupled to the CPU via a first communication protocol, the BMC including a first communication protocol controller, a BMC memory, a root of trust, and an internal BMC bus configured to communicatively couple the BMC memory, the first communication protocol controller, and the root of trust; and a boot non-volatile memory coupled to the BMC via the first communication protocol controller, the boot non-volatile memory being configured to store basic input/output system (BIOS) firmware and/or BMC firmware;

wherein the BMC is configured to run a serial peripheral interface (SPI) simulator runtime service for communicating with the CPU via an SPI interface, a root of trust service for setting a status associated with the BMC memory, and an SPI BIOS reader service for communicating with the boot non-volatile memory.

2. The system of claim 1, wherein the first communication protocol is a serial peripheral interface (SPI).

3. The system of claim 1, wherein the boot non-volatile memory is a flash chip.

4. The system of claim 1, wherein the BMC further includes a second communication protocol controller, the second communication protocol controller supporting out-of-band management.

5. The system of claim 4, wherein the second communication protocol controller is an Ethernet controller.

6. The system of claim 1, wherein the BMC is further configured to run a Redfish service for out-of-band communication.

7. The system of claim 1, wherein the root of trust service is configured to activate or inactivate memory locations in the BMC memory.

8. The system of claim 1, wherein the root of trust service is configured to seal or unseal memory locations in the BMC memory.

9. The system of claim 1, wherein the boot non-volatile memory is programmed by the SPI BIOS reader service when the memory locations in the BMC memory are sealed and activated.

10. The system of claim 1, wherein the root of trust is configured to verify content of the BMC memory via the internal BMC bus prior to storing the content of the BMC memory in the boot non-volatile memory as the BIOS firmware and/or the BMC firmware.

11. The system of claim 10, wherein the root of trust is configured to verify the content of the BMC memory once for multiple DC power cycles.

12. The system of claim 1, wherein the BMC is configured to retrieve the BIOS firmware from the boot non-volatile memory and store the BIOS firmware in the BMC memory, and the CPU is configured to retrieve the stored BIOS firmware in the BMC memory to perform a boot operation.

13. The system of claim 1, wherein capacity of the BMC memory is at least one gigabyte and capacity of the boot non-volatile memory less than 128 megabytes.

14. The system of claim 1, wherein the BMC memory is powered via DC standby power such that content of the BMC memory is preserved through multiple DC power cycles.

15. The system of claim 1, wherein the root of trust is configured to schedule a process of BIOS binary image back up to the boot non-volatile memory.

16. The system of claim 1, wherein the root of trust is configured to execute recovery actions from the boot non-volatile memory when BIOS binary image in the BMC memory fails verification.

17. The system of claim 1, wherein the BMC further includes a first communication protocol bus simulator running in slave mode, the first communication protocol bus simulator being configured to respond to boot non-volatile memory read and write demands from the CPU.

18. The system of claim 17, wherein the actions pertaining to the boot non-volatile memory read and write demands from the CPU are performed on the BMC memory instead of the boot non-volatile memory.

19. A computing system comprising:

a central processing unit (CPU);

a baseboard management controller (BMC) coupled to the CPU via a first communication protocol, the BMC including a first communication protocol controller, a BMC memory, a root of trust, and an internal BMC bus configured to communicatively couple the BMC memory, the first communication protocol controller, and the root of trust; and a first boot non-volatile memory coupled to the BMC via the first communication protocol controller, the first boot non-volatile memory being configured to store basic input/output system (BIOS) firmware; and a second boot non-volatile memory coupled to the BMC via the first communication protocol controller, the second boot non-volatile memory being configured to store BMC firmware;

wherein the BMC is configured to run a serial peripheral interface (SPI) simulator runtime service for communicating with the CPU via an SPI interface, a root of trust service for setting a status associated with the BMC memory, and an SPI BIOS reader service for communicating with one or more of the first boot non-volatile memory and the second boot non-volatile memory.

20. A computing system comprising:

a central processing unit (CPU);

a baseboard management controller (BMC) coupled to the CPU via a first communication protocol, the BMC including a first communication protocol controller, a BMC memory, a root of trust, and an internal BMC bus configured to communicatively couple the BMC memory, the first communication protocol controller, and the root of trust; and a boot non-volatile memory coupled to the BMC via the first communication protocol controller, the boot non-volatile memory being configured to store basic input/output system (BIOS) firmware and/or BMC firmware;

wherein the BMC memory is powered via DC standby power such that content of the BMC memory is preserved through multiple DC power cycles.

21. A computing system comprising:

a central processing unit (CPU);

a baseboard management controller (BMC) coupled to the CPU via a first communication protocol, the BMC including a first communication protocol controller, a BMC memory, a root of trust, and an internal BMC bus configured to communicatively couple the BMC memory, the first communication protocol controller, and the root of trust; and a boot non-volatile memory coupled to the BMC via the first communication protocol controller, the boot non-volatile memory being configured to store basic input/output system (BIOS) firmware and/or BMC firmware;

wherein the root of trust is configured to schedule a process of BIOS binary image back up to the boot non-volatile memory.

22. A computing system comprising:

a central processing unit (CPU);

a baseboard management controller (BMC) coupled to the CPU via a first communication protocol, the BMC including a first communication protocol controller, a BMC memory, a root of trust, and an internal BMC bus configured to communicatively couple the BMC memory, the first communication protocol controller, and the root of trust; and a boot non-volatile memory coupled to the BMC via the first communication protocol controller, the boot non-volatile memory being configured to store basic input/output system (BIOS) firmware and/or BMC firmware;

wherein the root of trust is configured to execute recovery actions from the boot non-volatile memory when BIOS binary image in the BMC memory fails verification.

* * * * *